Patented Apr. 29, 1941

2,240,271

UNITED STATES PATENT OFFICE 2,240,271

METHOD FOR PRODUCING UREA-FORMALDEHYDE RESINS

Walter Scheib, Erkner, near Berlin, Germany, assignor to Bakelite Gesellschaft mit beschränkter Haftung, Berlin, Germany No Drawing. Application March 25, 1939, Serial No. 264,129. In Germany April 5, 1938

8 Claims. (Cl. 260—45)

This invention relates to the manufacture of resinous, fusible condensation products and is a development of the invention described in application Serial No. 137,768 now Patent No. 2,163,264.

The aforesaid application No. 137,768 describes and claims a process for the manufacture of resinous, fusible condensation products which comprises intimately mixing in the absence of liquids solid urea and solid polymeric formaldehyde, with or without solid thiourea, if desired in the presence of catalysts and/or phenolaldehyde resins, at room temperature of about 15° to 25° C., and causing the urea, the thiourea if present, and the polymeric formaldehyde to react by storing the mixture obtained at a low temperature of about 15° to 35° C. until the smell of formaldehyde has substantially disappeared.

In carrying out this process technically and in further working up the condensation product it has proved to be very advantageous not to cause the loose mixture to react as such by standing at normal temperature, but previously to form the mixture into solid bodies such as tablets, plates or briquettes of desired size. Thus it was shown that making the mixture into tablets or shaping it, besides saving space, also exerts a very advantageous and unpredictable effect upon the course of the condensation reaction. Thus the time of reaction (time of standing) is considerably reduced and further the reaction of the resin-forming components proceeds far more uniformly and better, as may readily be established by determining the water-insoluble part of the finished resin. The novel process makes it possible to produce a better and more uniform, thoroughly condensed resin in a shorter time than is possible by condensation of the loose mixture.

A fusible condensation product is obtained by the novel process which can be stored for a long time without substantial alteration, particularly without substantial hardening, and is admirably adapted for all purposes of application for which urea-formaldehyde artificial resins are usually used. The product may at moderately elevated temperature alone or in admixture with other substances be subjected to a heat treatment in order to increase its degree of condensation and be worked up alone or in admixture with suitable additions into lacquers, coatings, laminated sheets, shaped articles or pressed masses.

In carrying out the process of this invention it is essential that the production of the condensation product from urea and solid, polymeric formaldehyde should take place without any external supply of heat and at low temperatures, since only in this case is a product formed which is capable of being stored and is only relatively slightly susceptible to heat influences. If, for example, the mixture of urea and formaldehyde is subjected to even only moderate heating, for example to 50° C., before the formation of the condensation product, as evidenced by the disappearance of the formaldehyde smell, has taken place, the condensation will proceed at considerable speed until an infusible product is formed.

The ratio of urea to the solid polymeric formaldehyde may be varied within wide limits. About 70 to 90 parts by weight of formaldehyde are for example employed per 100 parts by weight of urea in order to obtain a hardenable resin. The condensation of urea with the solid, polymeric formaldehyde may also be carried out with the addition of catalysts and the urea may be partly replaced by other compounds, for example thiourea, which likewise combine with the formaldehyde to form resinous products. If an acid catalyst is employed this may be neutralised with advantage at the end of the storing period by adding basic substances, for example ZnO.

The condensation products obtained according to this invention may also be worked up in admixture with other artificial or natural resins.

In order to produce pressed masses the readily fusible condensation products obtained according to this invention are employed as binders and are mixed in known manner with fillers, and, if necessary, subjected to a short polymerisation process, for example in a heated drum. After the polymerisation process the mixture of the condensation product with the fillers and the like is with advantage finely comminuted and is then ready for pressing. The chemical and mechanical properties of the resulting pressed masses fulfil all the requirements demanded of urea pressed masses.

Natural or artificial resins, water-fixing agents, pigments, softeners and fillers of any kind may be added in known manner to the mixtures to be pressed.

As an example tablets were produced of 10 mms. diameter and of 9 mm. height or tablets of 55 mms. diameter and of 25 mms. height. The latter were made into tablets under a pressure of 300 kgm./cm$^2$. The tablets and a sample of the loose mixture were stood under entirely similar conditions. The time of standing until disappearance of the intensive formaldehyde smell was on the average 20% shorter with the tablets than with the loose material. The water-insoluble part was determined in that 10 gms. of the finished resin which had been made into tablets and of the unshaped finished resin were each suspended in 200 ccs. of cold water, the suspension shaken from time to time, filtered off after 1½ hours and the residue dried over $CaCl_2$ in a vacuum desiccator and weighed. Whilst the insoluble residue of the material which had been formed into tablets amounted on the average to 10–12% of the resin, with the resin which had not been formed into tablets 18–20% of the resin remained undissolved.

What I claim is:

1. A process for the manufacture of resinous, fusible condensation products which comprises mixing solid urea and solid polymeric formaldehyde and molding the mixture obtained under pressure to molded bodies at room temperature, and causing to react said urea and said solid polymeric formaldehyde by storing said molded bodies at a low temperature of about 15–35° C. until the smell of formaldehyde has substantially disappeared.

2. A process for the manufacture of resinous, fusible condensation products which comprises mixing 100 parts by weight of solid urea and about 70–90 parts by weight of solid polymeric formaldehyde and molding the mixture obtained under pressure to molded bodies at room temperature, and causing to react said urea and said solid polymeric formaldehyde by storing said molded bodies at a low temperature of about 15° to 35° C. until the smell of formaldehyde has substantially disappeared.

3. A process for the manufacture of resinous, fusible condensation products which comprises mixing solid urea, solid thiourea and solid polymeric formaldehyde and molding the mixture obtained under pressure into solid bodies at room temperature, and causing to react said urea, said thio-urea and said solid polymeric formaldehyde by storing said molded bodies at a low temperature of about 15° to 35° C. until the smell of formaldehyde has substantially disappeared.

4. A process for the manufacture of resinous fusible condensation products which comprises mixing solid urea and solid polymeric formaldehyde in the presence of catalysts and molding the mixture obtained under pressure into molded bodies at room temperature and causing to react said urea and said solid polymeric formaldehyde by storing said molded bodies at a low temperature of about 15° to 35° C. until the smell of formaldehyde has substantially disappeared.

5. A process for the manufacture of resinous, fusible condensation products which comprises mixing 100 parts by weight of solid urea and about 70 to 90 parts by weight of solid polymeric formaldehyde in the presence of catalysts and molding the mixture obtained under pressure into molded bodies at room temperature, and causing to react said urea and said solid polymeric formaldehyde by storing said molded bodies at a low temperature of about 15° C. to 35° C. until the smell of formaldehyde has substantially disappeared.

6. A process for the manufacture of resinous, fusible condensation products as claimed in claim 5 wherein part of the urea is replaced by thiourea.

7. A process for the manufacture of resinous, fusible condensation products which comprises mixing solid urea and solid polymeric formaldehyde in the presence of phenol-aldehyde resins, and molding the mixture obtained under pressure into molded bodies at room temperature, and causing to react said urea and said polymeric formaldehyde by storing said molded bodies at a low temperature of about 15° to 35° C. until the smell of formaldehyde has substantially disappeared.

8. A process for the manufacture of resinous, fusible condensation products which comprises mixing 100 parts by weight of solid urea and about 70 to 90 parts by weight of solid polymeric formaldehyde in the presence of catalysts and phenol-aldehyde resins and molding the mixture obtained under pressure into molded bodies at room temperature and causing to react said urea and said molded polymeric formaldehyde by storing said solid bodies at a low temperature of about 15° to 35° C. until the smell of formaldehyde has substantially disappeared.

WALTER SCHEIB.